US012196269B2

(12) United States Patent
Eitelhuber (10) Patent No.: US 12,196,269 B2
(45) Date of Patent: Jan. 14, 2025

(54) SHAFT AND A COUPLING MEMBER FOR COUPLING SHAFTS

(71) Applicant: Georg Robert Eitelhuber, Thuwal (SA)

(72) Inventor: Georg Robert Eitelhuber, Thuwal (SA)

(73) Assignee: NOMADD DESERT SOLAR SOLUTIONS, Singapore (SG)

( * ) Notice: Subject to any disclaimer, the term of this patent is extended or adjusted under 35 U.S.C. 154(b) by 656 days.

(21) Appl. No.: 17/162,586

(22) Filed: Jan. 29, 2021

(65) Prior Publication Data

US 2022/0240657 A1 Aug. 4, 2022

(51) Int. Cl.
| | |
|---|---|
| *F16D 1/033* | (2006.01) |
| *F16B 7/18* | (2006.01) |
| *A46B 13/00* | (2006.01) |
| *H02S 40/10* | (2014.01) |

(52) U.S. Cl.
CPC .............. *F16D 1/033* (2013.01); *F16B 7/182* (2013.01); *A46B 13/005* (2013.01); *H02S 40/10* (2014.12); *Y10T 403/5741* (2015.01)

(58) Field of Classification Search
CPC ...... A46B 13/005; F16B 7/0406; F16B 7/185; F16B 9/052; F16B 2200/506; F16B 7/182; F16C 3/023; F16D 1/033; F16D 1/076; F16D 3/78; F16D 3/79; H02S 40/10; Y10S 403/15; Y10T 403/4681; Y10T 403/4685; Y10T 403/5741; Y10T 403/645
USPC ................. 403/258, 260, 306, 337, DIG. 15; 464/182
See application file for complete search history.

(56) References Cited

U.S. PATENT DOCUMENTS

| | | | | |
|---|---|---|---|---|
| 2,494,639 A * | 1/1950 | Yates | ......................... | F16D 1/02 464/7 |
| 2,499,093 A * | 2/1950 | Webb | ......................... | F16D 3/78 464/94 |
| 2,855,767 A * | 10/1958 | Gustav | ....................... | F16D 3/79 464/98 |
| 3,985,000 A * | 10/1976 | Hartz | ......................... | F16D 3/79 403/337 |
| 4,055,966 A * | 11/1977 | Fredericks | ................ | F16D 3/78 464/99 |

(Continued)

FOREIGN PATENT DOCUMENTS

| | | | | |
|---|---|---|---|---|
| DE | 2353303 A1 * | 5/1974 | ............... | F16D 3/78 |
| DE | 9313417 U1 * | 12/1993 | ............... | F16D 3/78 |

(Continued)

*Primary Examiner* — Josh Skroupa
(74) *Attorney, Agent, or Firm* — Kendal M. Sheets (57) ABSTRACT

A coupling member to couple a first shaft with a second shaft. The coupling member may include a flat member having a set of holes positioned along its circumference. The set of holes may include a first sub-set of holes coinciding with holes associated with the first shaft and a second sub-set of holes coinciding with holes associated with the second shaft. Each of the first shaft and the second shaft may include a plurality of rib segments, each rib segment having a hole. The coupling member may be configured to couple with the first shaft via the first sub-set of holes and the plurality of holes associated with the first shaft. The coupling member may be further configured to couple with the second shaft via the second sub-set of holes and the plurality of holes associated with the second shaft.

4 Claims, 5 Drawing Sheets

(56) References Cited

U.S. PATENT DOCUMENTS

| | | | | | |
|---|---|---|---|---|---|
| 4,325,650 | A | * | 4/1982 | Masai | F16D 3/60 403/372 |
| 5,019,015 | A | * | 5/1991 | Wasserfuhr | F16D 3/78 464/99 |
| 5,203,441 | A | * | 4/1993 | Monette | F02B 61/06 403/337 |
| 6,440,000 | B1 | * | 8/2002 | Asa | F16D 3/78 464/99 |
| 6,514,147 | B2 | * | 2/2003 | Aoki | F16D 3/78 403/337 |
| 7,003,842 | B1 | * | 2/2006 | Favagrossa | A46B 13/005 15/23 |
| 8,167,575 | B2 | * | 5/2012 | Eusterbarkey | F16D 1/033 403/335 |
| 9,771,983 | B2 | * | 9/2017 | Marks | F16D 1/033 |
| 10,473,131 | B1 | * | 11/2019 | Allen | E21B 17/006 |
| 11,428,005 | B2 | * | 8/2022 | Hill | E04H 12/08 |
| 11,486,450 | B2 | * | 11/2022 | Isobe | F16D 3/79 |

FOREIGN PATENT DOCUMENTS

| | | | | | |
|---|---|---|---|---|---|
| EP | 0162141 | A1 | * | 11/1985 | F16D 3/78 |
| EP | 0753274 | A1 | * | 1/1997 | A46B 13/005 |
| GB | 253802 | A | * | 6/1926 | A46B 13/005 |
| WO | WO-2019196265 | A1 | * | 10/2019 | A46B 13/005 |

* cited by examiner

SHAFT AND A COUPLING MEMBER FOR COUPLING SHAFTS

TECHNICAL FIELD

This disclosure relates generally to cleaning apparatus, and particularly to a shaft for mounting ancillary members like cleaning brushes, and a coupling member for coupling two or more shafts.

BACKGROUND

There has lately been a steep rise in the adoption of the solar-based technology as an alternative to energy production technologies. This has led to installation of a large number of solar power plants, which use solar panels. As it will be appreciated by those skilled in the art, the solar panels require regular cleaning, for example to remove dust, for efficient working of the solar panels.

The solar panels may be cleaned by robotic device using brush assemblies. Due to large size of the solar panels, large-sized brush assemblies may be required. For example, the brush assembly may include a cleaning brush mounted on a shaft. Therefore, in order obtain a brush assembly large enough to be able to clean the solar panels, either a sufficiently long single shaft may be used, or a shaft assembly having two or more shafts coupled together may be used.

However, such a shaft or shaft assembly beyond a certain length may start to bend and deform. As a result, the resultant brush assembly is not sufficiently stiff to maintain its straightness and successfully perform the cleaning operation. Further, the process of coupling two or more shafts may be a challenging task.

Therefore, a shaft having sufficient stiffness to maintain its straightness over long length, and further capable of easily and effectively coupling with another shafts is desired. Further, an effective and simple mechanism of coupling two shafts is desired.

SUMMARY

In an embodiment, a shaft for mounting ancillary members is disclosed. The shaft may be moulded to include an elongated core segment. The shaft may be moulded to further include a plurality of U-shaped slots formed along a circumference of the elongated core segment and extending along a portion of a length of the elongated core segment. The plurality of U-shaped slots may further extend radially outwards from the elongated core segment. Further, each of the plurality of U-shaped slots may be configured to accommodate an ancillary member. The shaft may be moulded to further include a plurality of rib segments formed along the circumference of the elongated core segment and extending along a portion of the length of the elongated core segment. The plurality of rib segments may further extend radially outwards from the elongated core segment. The plurality of rib segments may be configured to enable coupling of the shaft with another shaft.

In another embodiment, a coupling member to couple a first shaft with a second shaft is disclosed. The coupling member may be moulded to include a flat member having a set of holes positioned along its circumference. The set of holes may include a first sub-set of holes configured to coincide with a plurality of holes associated with the first shaft and a second sub-set of holes configured to coincide with a plurality of holes associated with the second shaft. Each of the first shaft and the second shaft may be moulded to comprise an elongated core segment and a plurality of rib segments formed along a circumference of the elongated core segment and extending radially outwards from the elongated core segment. Further, each of the plurality of rib segments (of the first shaft or the second shaft) may include a hole (of the plurality of holes associated with the first shaft or the second shaft respectively). The coupling member may be configured to couple with the first shaft via the first sub-set of the set of holes associated with the coupling member and the plurality of holes associated with the plurality of rib segments of the first shaft. The coupling member may be further configured to couple with the second shaft via the second sub-set of the set of holes associated with the coupling member and the plurality of holes associated with the plurality of rib segments of the second shaft.

The accompanying drawings, which are incorporated in and constitute a part of this disclosure, illustrate exemplary embodiments and, together with the description, serve to explain the disclosed principles.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

A shaft for mounting ancillary members is disclosed. The shaft may be manufactured by moulding, or extrusion. The shaft includes an elongated core segment, a plurality of U-shaped slots, and a plurality of rib segments. Each of the plurality of U-shaped slots may accommodate an ancillary member, such as a cleaning brush, by sliding along the length of a U-shaped slot. Further, each of the plurality of rib segments may include a hole extending along a portion of the length of the respective rib segment Further disclosed is a coupling member configured to couple a first shaft with a second shaft. The coupling member may include a flat member having a set of holes positioned along the circumference of the flat member. The set of holes may include a first sub-set of holes and a second sub-set of holes. The first sub-set of holes may coincide with the plurality of holes associated with the first shaft, and the second sub-set of holes may coincide with a plurality of holes associated with the second shaft. The coupling member may be configured to couple with the first shaft via the first sub-set of the set of holes and the plurality of holes associated with the first shaft using a first set of fasteners. The coupling member may be further configured to couple with the second shaft via the second sub-set of the set of holes associated with the coupling member and the plurality of holes associated with the second shaft, using a second set of fasteners. By way of coupling the coupling member with the first shaft, and then coupling the second shaft with the coupling member, a coupling of the first shaft and the second shaft is obtained.

Figure 1A:
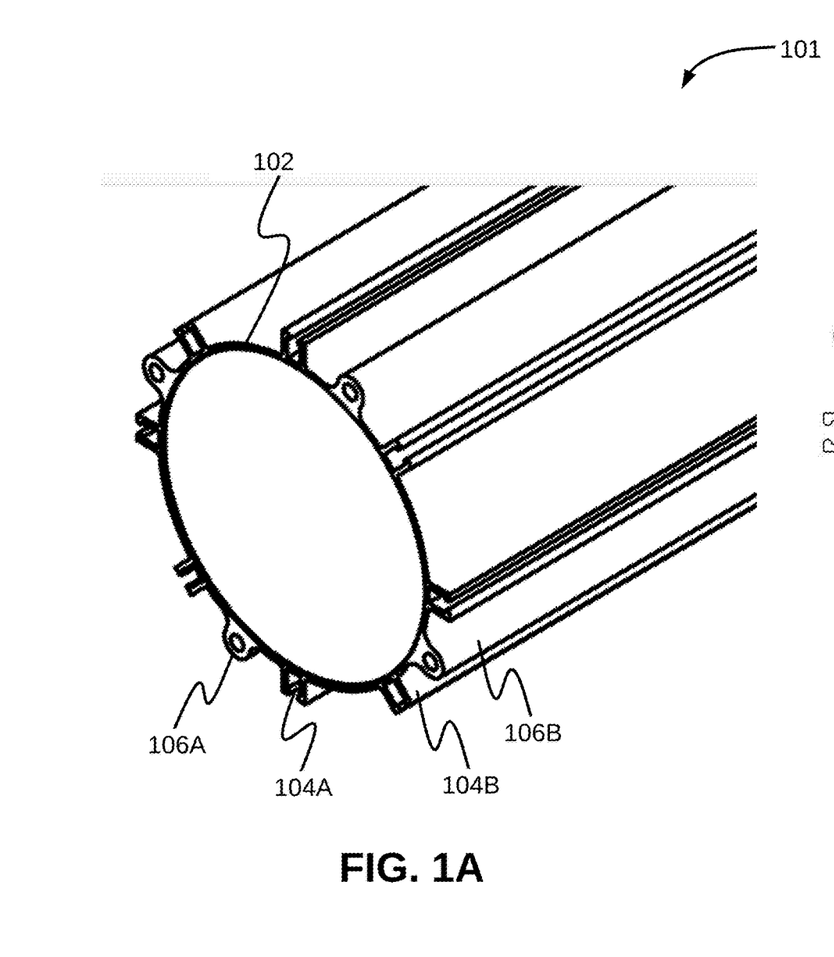
FIG. 1A illustrates a perspective view of a shaft for mounting ancillary members, in accordance with some embodiments of the present disclosure.
Figure 1B:
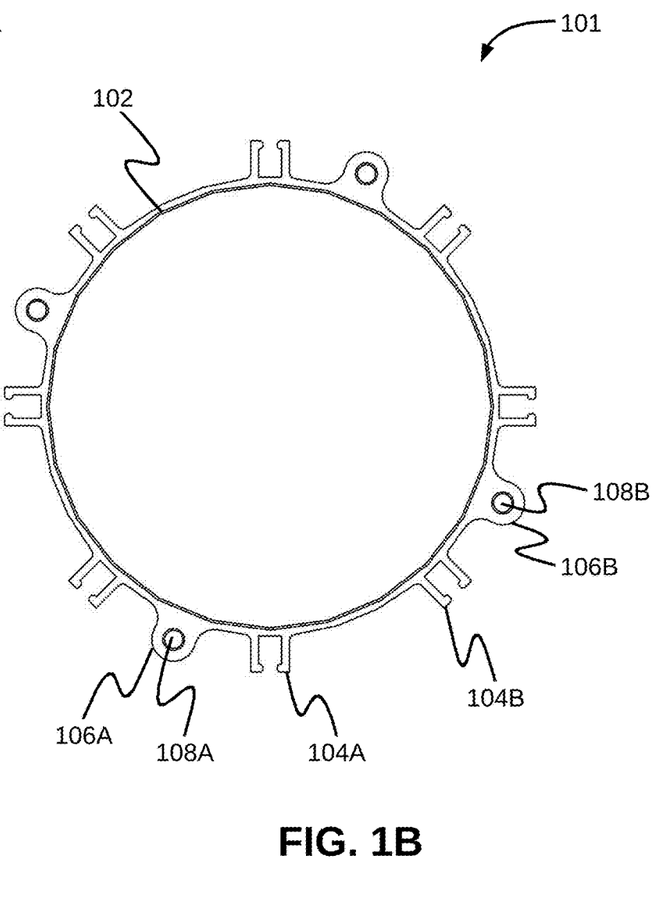
FIG. 1B illustrates a side view of the shaft for mounting ancillary members, in accordance with some embodiments of the present disclosure.

Referring now to FIG. 1A-B, a perspective view and a side view, respectively, of a shaft 101 for mounting ancillary members is disclosed. In some embodiments, the shaft 101 may be manufactured by moulding or extrusion. Further, in some embodiments, the shaft 101 may be moulded to include an elongated core segment 102. The core segment 102 may run along the length of the shaft 101. In some embodiments, as shown in FIG. 1A, the core segment 102 may have a circular cross-section. However, in alternate embodiments, the core segment 102 may have a polygonal cross-section, for example, a hexagonal or an octagonal cross-section.

The shaft 101 may further include a plurality of U-shaped slots 104. For example, as shown in FIG. 1A, the shaft 101 may include a first U-shaped slot 104A, a second U-shaped slot 104B, and so on (the various U-shaped slots of the shaft 101 may be collectively referred to as plurality of U-shaped slots 104, in this disclosure). Each of the plurality of U-shaped slots 104 may be formed along a circumference of the elongated core segment 102, and may extend along a portion of a length of the elongated core segment 102. By way of an example, a U-shaped slot of the plurality of U-shaped slots 104 may extend along the entire length of the elongated core segment 102, or until a portion of the length of the elongated core segment 102, for example, until half the length of the elongated core segment 102.

Further, each of the plurality of U-shaped slots 104 may extend radially outwards from the elongated core segment 102. It may be noted that each of the plurality of U-shaped slots 104 may be configured to accommodate an ancillary member (not shown in FIGS. 1A-B). In some embodiments, the ancillary member may be a cleaning brush. Further, the ancillary member may be configured to be accommodated in one of the plurality of U-shaped slots 104 by sliding along the length of one of the plurality of U-shaped slots 104. This is further explained in conjunction with FIGS. 3A-B.

The shaft 101 may further include a plurality of rib segments 106. For example, as shown in FIG. 1A-B, the shaft 101 may include a first rib segment 106A, a second first rib segment 106A, and so on (the various rib segments of the shaft 101 may be collectively referred to as plurality of rib segments 106, in this disclosure). Each of the plurality of rib segments 106 may be formed along the circumference of the elongated core segment 102 and may extend along a portion of the length of the elongated core segment 102A. By way of an example, a rib segment of the plurality of rib segments 106 may extend along the entire length of the elongated core segment 102, or until a portion of the length of the elongated core segment 102, for example, until half the length of the elongated core segment 102. Further, each of the plurality of rib segments 106 may extend radially outwards from the elongated core segment 102. The plurality of rib segments 106 may be configured to enable coupling of the shaft 101 with another shaft (not shown in FIG. 1A-B) which is similar to the shaft 101.

It may be understood that the plurality of U-shaped slots 104 and the plurality of rib segments 106 may be positioned about the circumference of the core segment 102. Further, it may be noted that, in some embodiments, the plurality of rib segments 106 may be evenly spaced from each other. Similarly, the plurality of U-shaped slots 104 may be evenly spaced from each other. Further, in some embodiments, a set of rib segments from the plurality of rib segments 106 and a set of U-shaped slots from the plurality of U-shaped slots 104 may be positioned alternately.

By way of an example, as shown in FIG. 1B, the shaft includes eight U-shaped slots (four sets of two U-shaped slots each) and four rib segments positioned about the circumference of the core segment 102. Further, the eight U-shaped slots may be equally spaced from each other, and the four rib segments may be equally spaced from each other. Furthermore, the four sets of two U-shaped slots each and the four rib segments may be positioned alternately. For example, a set of U-shaped slots including the first U-shaped slot 104A and the second U-shaped slot 104B is placed in between the first rib segment 106A and the second rib segment 106B. It should be noted that the positioning of each of the plurality of U-shaped slots 104 and the plurality of rib segments 106 may vary based on the requirement.

It may be further noted that each of the plurality of rib segments 106 may include a hole extending along a portion of the length of the respective rib segment of the plurality of rib segments 106. For example, as shown in FIG. 1B, the first rib segment 106A includes a first hole 108A, the second rib segment 106B includes a second hole 108B, and so on (the first hole 108A, the second hole 108B, etc. may be collectively referred to as plurality of holes 108, in this disclosure). It may be further noted that the hole may extend along a portion of the length of the respective rib segment of the plurality of rib segments 106, or through the entire length of the respective rib segment of the plurality of rib segments 106. In other words, each of the plurality of rib segments 106 may be hollow either up to a portion of the length or the entire length of the respective rib segment of the plurality of rib segments 106. Further, each of the holes may include a threaded region to allow fastening of a fastener like a bolt or a screw, or a stud. As it will be explained later, the shaft 101 may be coupled to another shaft via the plurality of holes 108 using fasteners. It may be noted that the shaft 101 may be configured to be coupled to a coupling member (not shown in FIG. 1A-B), and further configured to be coupled to another similar shaft via the coupling member. This is further explained in detail, in conjunction with FIG. 2A-B.

Figure 2A:
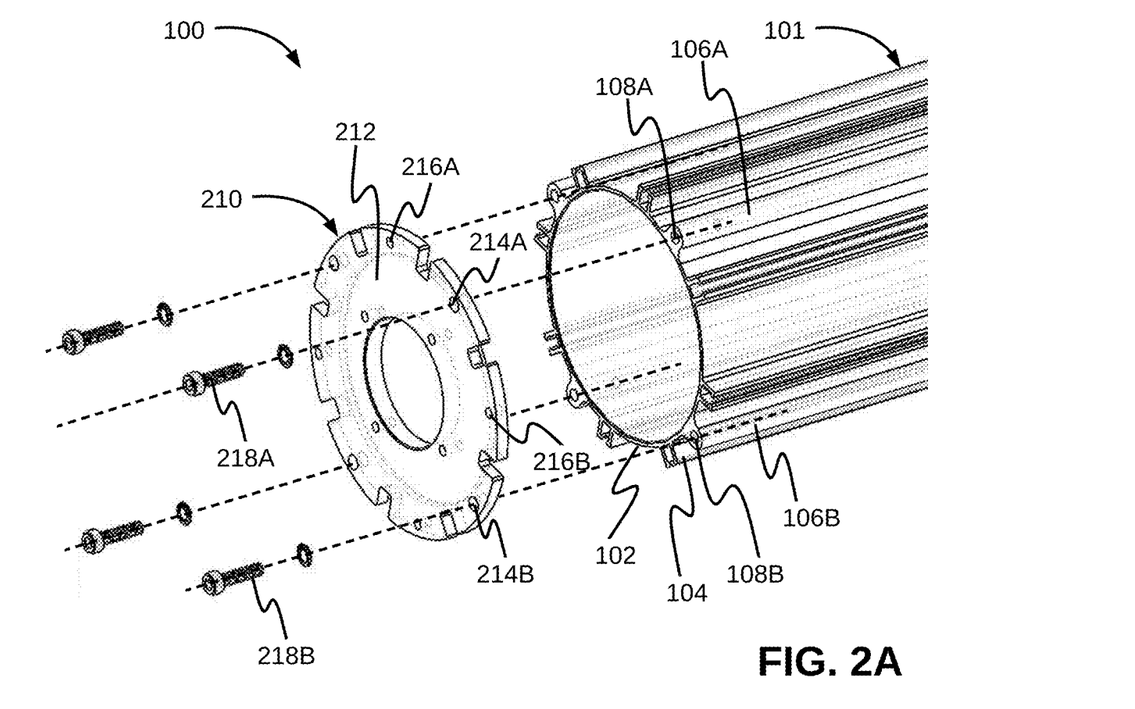
FIG. 2A illustrates a perspective view of a portion of an unassembled brush assembly, in accordance with an embodiment of the present disclosure.

Referring now to FIG. 2A, a perspective view of a portion of an unassembled brush assembly 100 is illustrated, in accordance with an embodiment of the present disclosure. The brush assembly 100 may include the shaft 101 and a coupling member 210. As mentioned above, the first shaft

101 may include the elongated core segment 102, and the plurality of rib segments 106 formed along the circumference of the elongated core segment 102. Further, the plurality of rib segments 106 of the first shaft 101 may include the plurality of holes 108. For example, the first rib segment 106A includes the first hole 108A, the second rib segment 106B includes the second hole 108B, and so on.

The coupling member 210 may be configured to couple a first shaft, for example, i.e. the shaft 101 with a second shaft (not shown in FIG. 2A). As mentioned above, the shaft 101 may be used in cleaning of solar panels. However, in some cases, owing to large sizes of the solar panels, a single shaft may not sufficiently cover the entire size of the solar panels. As such, in such cases, the shaft 101 may be coupled to one or more similar shafts to obtain a longer shaft. To this end, the shaft 101 may be coupled to the second shaft using the coupling member 210.

In some embodiments, the coupling member 210 may be manufactured by moulding a material. In alternate embodiments, the coupling member 210 may be obtained by machining a piece of material. For example, the material may include a metal, or an alloy, etc. In some embodiments, the coupling member 210 may by moulded to include a flat member 212 having a set of holes positioned along the circumference of the flat member 212. In some embodiments, the set of holes may include a first sub-set of holes 214 and a second sub-set of holes 216. For example, as shown in FIG. 2A, the first sub-set of holes 214 may include holes 214A, 214B, and so on. Further, the second sub-set of holes 216 may include holes 216A, 216B, and so on. In some embodiments, as shown in the FIG. 2A, the first sub-set of holes 214 and the second sub-set of holes 216 may be positioned alternatively along the circumference of the flat member 212.

In may be noted that the first sub-set of holes 214 may be configured to coincide with the plurality of holes 108 associated with the first shaft 101. For example, the hole 214A and the hole 214B of the first sub-set of holes 214 may coincide with the first hole 108A (associated with the first rib segment 106A) and the second hole 108B (associated with the second rib segment 106B), respectively. Similarly, the second sub-set of holes 216 may be configured to coincide with a plurality of holes associated with the second shaft (not shown in FIG. 2A).

The shaft 101 may be configured to be coupled to the coupling member 210 via the first sub-set of holes 214 of the coupling member 210 and the plurality of holes 108 associated with the plurality of rib segments 106 of the shaft 101A, using a first set of fasteners 218. The first set of fasteners 218 may include a fastener 218A, a fastener 218B, and so on. The first set of fasteners 218 may include one or more bolts or screws, or studs. For example, upon aligning (coinciding) the hole 214A of the first sub-set of holes 214 with the first hole 108A, the fastener 218A may be used to fasten the coupling member 210 with the shaft 101 via the hole 214A and the first hole 108A. Similarly, upon aligning (coinciding) the hole 214B of the first sub-set of holes 214 with the second hole 108B, the fastener 218B may be used to fasten the coupling member 210 with the shaft 101 via the hole 214B and the second hole 108B.

Figure 2B:
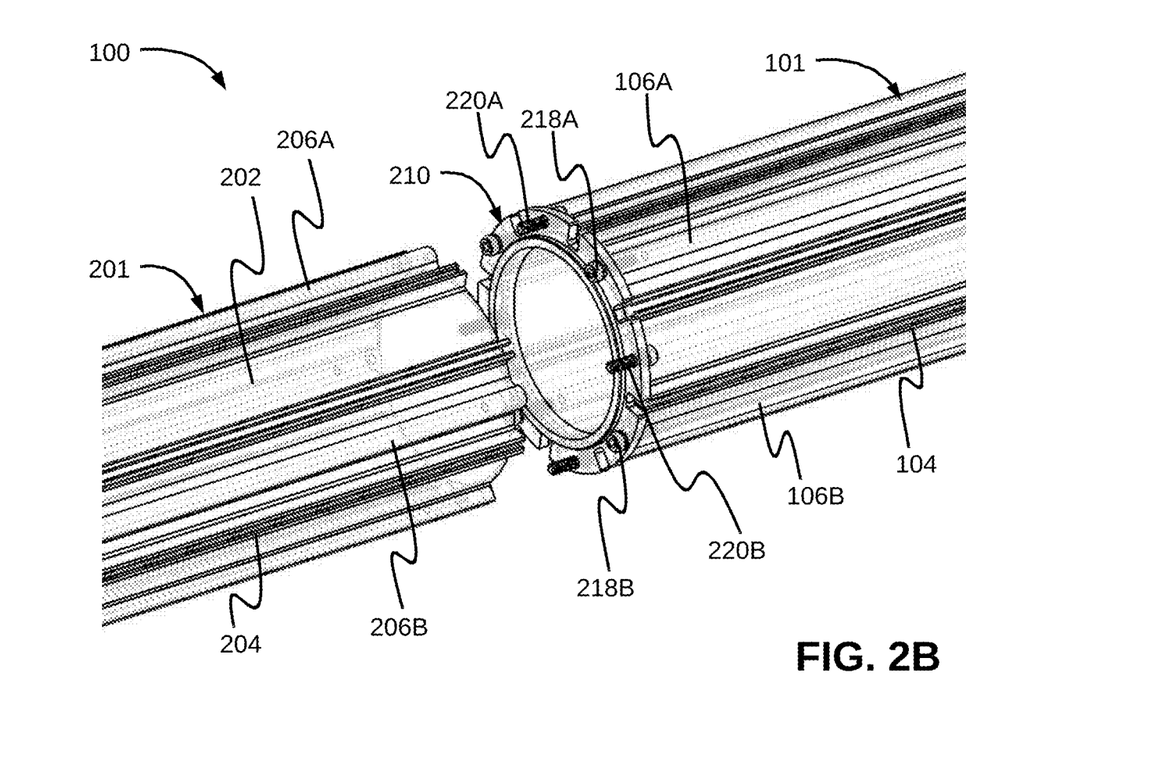
FIG. 2B illustrates a perspective view of a portion of an assembled brush assembly, in accordance with an embodiment of the present disclosure.

Referring now to FIG. 2B, a perspective view of a portion of an assembled brush assembly 100 is illustrated, in accordance with an embodiment of the present disclosure. The brush assembly 100 includes the shaft 101, the coupling member 210, and a second shaft 201. As mentioned above, the first shaft 101 may include the elongated core segment 102, the plurality of rib segments 106 formed along the circumference of the elongated core segment 102, and each of the plurality of rib segments 106 may include a hole of the plurality of holes 108. The coupling member 210 may be moulded to include the flat member 212 having a set of holes positioned along the circumference of the flat member 212. The set of holes may include a first sub-set of holes 214 and a second sub-set of holes 216.

As shown in FIG. 2B, the shaft 101 is coupled to the coupling member 210 via the first sub-set of holes 214 of the coupling member 210 and the plurality of holes 108 associated with the plurality of rib segments 106 of the shaft 101A, using a first set of fasteners 218. For example, the fastener 218A couples the coupling member 210 with the shaft 101 via the hole 214A and the first hole 108A. Similarly, the fastener 218B couples the coupling member 210 with the shaft 101 via the hole 214B and the second hole 108B. In other words, the fastener 218A may be fastened to the first rib segment 106A via the first hole 108A, while passing through the hole 214A of the coupling member 210, thereby coupling the coupling member 210 with the first shaft 101. For example, the fastener 218A may be a bolt which may be bolted into the first rib segment 106A via the first hole 108A. Similarly, the fastener 218B may be a bolt which may be bolted into the second rib segment 106B via the second hole 108B, while passing through the hole 214B of the coupling member 210, thereby coupling the coupling member 210 with the first shaft 101.

Further, as shown in the FIG. 2B, similar to the first shaft 101, the second shaft 201 may include an elongated core segment 202, a plurality of U-shaped slots 204 (one of the plurality of U-shaped slots 204 is shown in FIG. 2B), and a plurality of rib segments 206 formed along the circumference of the elongated core segment 102. For example, the plurality of rib segments 206 may include a first rib segment 206A, a second rib segment 206B, and so on. The plurality of rib segments 206 may extend radially outwards from the elongated core segment 202, and each of the plurality of rib segments 206 may include a hole of a plurality of holes 208. For example, a first rib segment 206A may include a first hole 208A, a second rib segment 206B may include a second hole 208B, and so on (the first hole 208A, the second hole 208B, etc. are collectively called a plurality of holes 208 in this disclosure).

The coupling member 210 may be further configured to couple with the second shaft 201 via the second a sub-set of holes 216 associated with the coupling member 210 and the plurality of holes 208 associated with the plurality of rib segments 206 of the second shaft 201, using a second set of fasteners 220. For example, the first rib segment 206A includes a first hole 208A (not shown in FIG. 2A), the second rib segment 206B includes a second hole 208B (not shown in FIG. 2A), and so on.

It may be noted that the second sub-set of holes 216 may be configured to coincide with the plurality of holes 208 associated with the second shaft 201. For example, the hole 216A and the hole 216B of the second sub-set of holes 216 may coincide with the first hole 208A (associated with the first rib segment 206A) and the second hole 208B (associated with the second rib segment 206B), respectively.

Upon aligning (coinciding) the hole 216A with the first hole 208A, a fastener 220A of a second set of fasteners 220 may be used to fasten the coupling member 210 with the second shaft 201 via the hole 216A and the first hole 208A. Similarly, upon aligning (coinciding) the hole 216B with the second hole 208B, a fastener 220B may be used to fasten the coupling member 210 with the second shaft 201 via the hole 216B and the second hole 208B. Similar to the first set of fasteners 218, the second set of fasteners 220 may be bolts or screws, or studs. As it will understood, by way of coupling the coupling member 210 with the first shaft 101, and then coupling the second shaft 201 with the coupling member 210, a coupling of the first shaft 101 and the second shaft 201 is obtained.

Figure 2C:
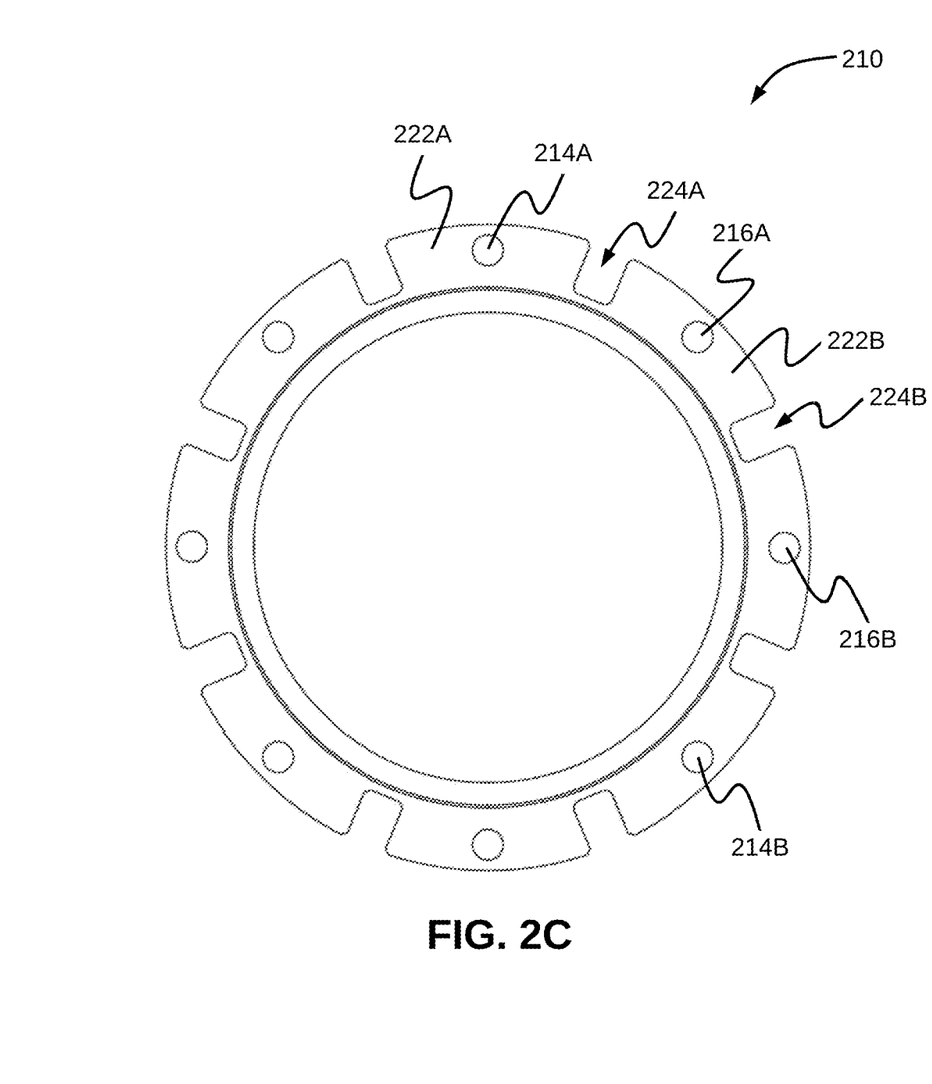
FIG. 2C illustrates a front view of the coupling member, in accordance with an embodiment of the present disclosure.
Figure 2D:
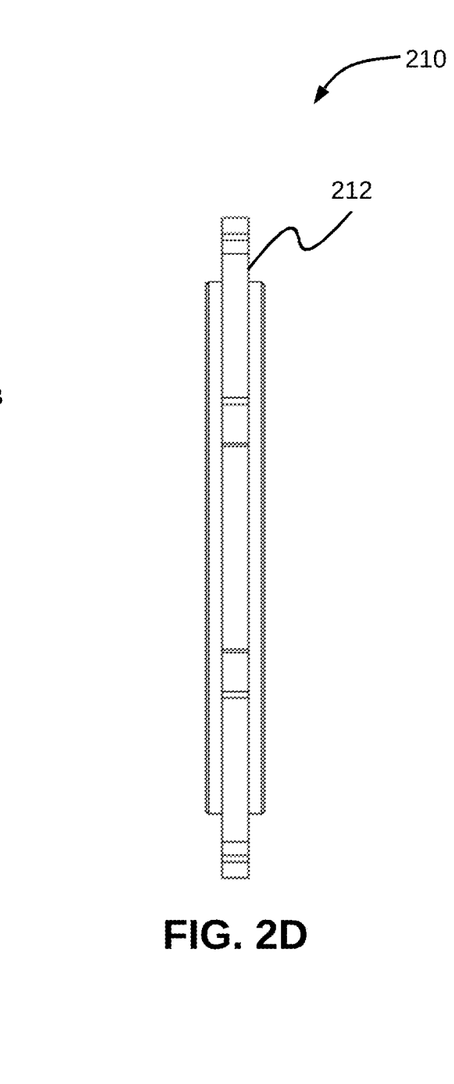
FIG. 2D illustrates a side view of the coupling member, in accordance with an embodiment of the present disclosure.

Referring now to FIG. 2C-D, a front view and a side view, respectively, of the coupling member 210 are illustrated, in accordance with an embodiment of the present disclosure. As mentioned above, the coupling member 210 may be moulded to include the flat member 212 having a set of holes positioned along the circumference of the flat member 212. The set of holes may include the first sub-set of holes 214 (for example, holes 214A, 214B, and so on) and the second sub-set of holes 216 (for example, holes 216A, 216B).

In some embodiments, the flat member 212 may further include a plurality of flanges 222 along its circumference. For example, the plurality of flanges 222 may include a first flange 222A, a second flange 222B, and so on. Further each two flanges of the plurality of flanges 222 may be spaced apart to create a slot between each two flanges. For example, the first flange 222A and the second flange 222B may be spaced apart to create a first slot 224A between them. Further, it may be noted that the flat member 212 may be shaped to match the shape of the first shaft 101 and the second shaft 201.

As mentioned above, each of the plurality of U-shaped slots 104 of the first shaft 101 and each of the plurality of U-shaped slots 204 of the second shaft 201 may be configured to accommodate an ancillary member, like a cleaning brush. For example, the ancillary member (cleaning brush) may be accommodated in one of the plurality of U-shaped slots 104, 204 by sliding along the length of the respective U-shaped slot.

It may be noted that in some scenarios, the length of the ancillary member may be longer than the length of the shaft 101 or shaft 201. As such, when the ancillary member is to be mounted on a shaft assembly (for example, an assembly of the first shaft 101, the coupling member 210, and the second shaft 201), the ancillary member traverses from the first shaft 101 to the second shaft 201 while passing through the coupling member 210. Therefore, in such scenarios, the slots 224 on the coupling member may allow sliding of the ancillary member along the length of the respective U-shaped slot through the coupling member 210. By way of this, the ancillary member may be accommodated in one of the plurality of U-shaped slots 104 of the first shaft 101 and in one of the plurality of U-shaped slots 2 of the second shaft 201.

Figures 3A, 3B:
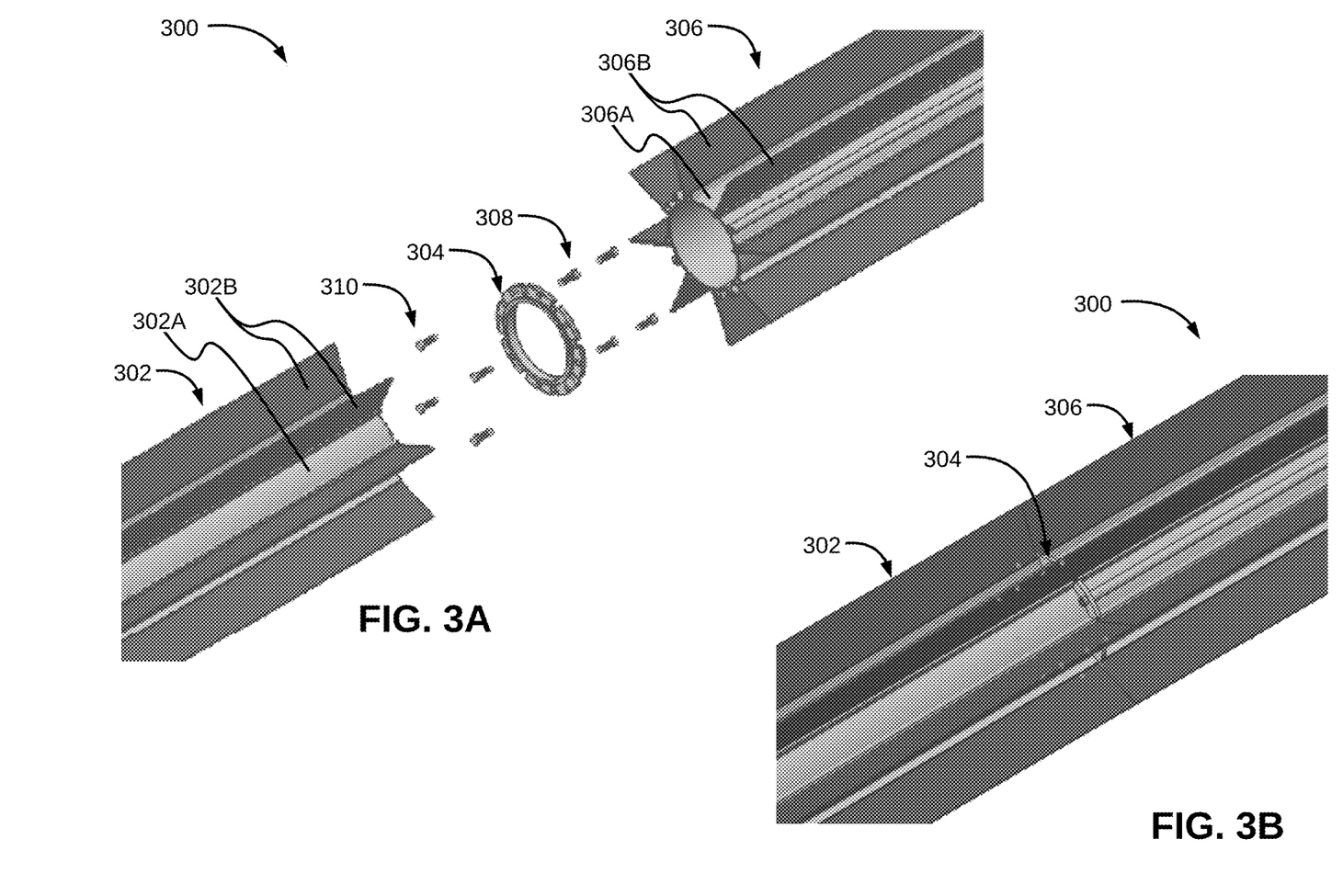
FIG. 3A illustrates a perspective view of a portion of an unassembled brush assembly, in accordance with another embodiment of the present disclosure.
FIG. 3B illustrates a perspective view of a portion of an assembled brush assembly, in accordance with another embodiment of the present disclosure.

Referring now to FIG. 3A, a perspective view of a portion of an unassembled brush assembly 300 is illustrated, in accordance with an embodiment of the present disclosure. The brush assembly 300 may include a first brush-mounted shaft 302, a coupling member 304, and a second brush-mounted shaft 306. For example, the first brush-mounted shaft 302 may include a shaft 302A (corresponding to the first shaft 101) and a plurality of cleaning brushes 302B mounted on the shaft 302A. Similarly, the second brush-mounted shaft 306 may include a shaft 306A (corresponding to the second shaft 201) and a plurality of cleaning brushes 306B mounted on the shaft 306A. As mentioned above, the plurality of cleaning brushes may be accommodated in the plurality of U-shaped slots of the respective shaft by sliding along the length of the plurality of U-shaped slots.

The first brush-mounted shaft 302 may be configured to be coupled with the coupling member 304 using a first set of fasteners 308. Further, the coupling member 304 may be configured to be coupled with the second brush-mounted shaft 306 using a first set of fasteners 308.

Referring now to FIG. 3B, a perspective view of a portion of an assembled brush assembly 300 is illustrated, in accordance with an embodiment of the present disclosure. The brush assembly 300 includes the first shaft brush mounted shaft 302, the coupling member 304, and the second brush-mounted shaft 306. By way of coupling the first brush-mounted shaft 302 with the coupling member 304 (using the first set of fasteners 308), and then coupling the coupling member 304 with the second brush-mounted shaft 306 (using the second set of fasteners 310), the first brush-mounted shaft 302 is coupled with the second brush-mounted shaft 306.

Figure 4:
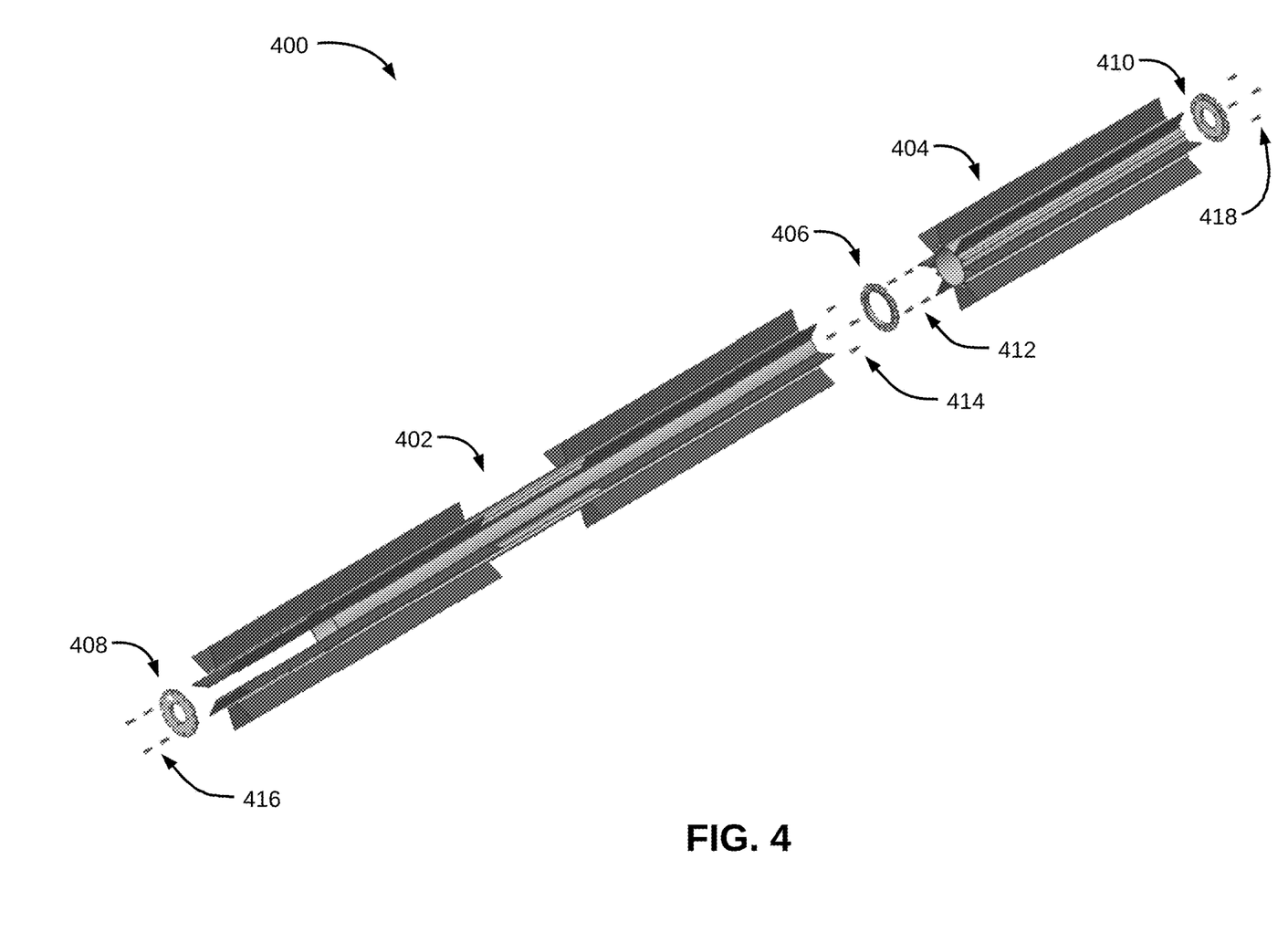
FIG. 4 illustrates a perspective view of a portion of an unassembled brush assembly, in accordance with yet another embodiment of the present disclosure.

Referring to FIG. 4, a perspective view of an unassembled portion of a brush assembly 400 is illustrated, in accordance with an embodiment. As shown in FIG. 4, the brush assembly 400 may include a first brush-mounted shaft 402, a second brush-mounted shaft 404, a first coupling member 406, a second coupling member 408, and a third coupling member 410. Further, as shown in the FIG. 4, the first brush-mounted shaft 402 may include two cleaning brushes mounted side-by-side in each of the U-shaped slots.

The first brush-mounted shaft 402 may be configured to be coupled with the first coupling member 406 using a first set of fasteners 412. The second brush-mounted shaft 404 may be configured to be coupled with the first coupling member 406 using a second set of fasteners 414. Further, the first brush-mounted shaft 402 may be configured to be coupled with the second coupling member 408 using a third set of fasteners 416. It may be understood that the second coupling member 408 may be further configured to be coupled with a third first brush-mounted shaft (not shown in FIG. 4) using a fourth set of fasteners (not shown in FIG. 4). Similarly, the second brush-mounted shaft 404 may be further configured to be coupled with the third coupling member 410 using a fifth set of fasteners 418. The third coupling member 410 may be further configured to be coupled with a fourth brush-mounted shaft (not shown in FIG. 4) using a sixth set of fasteners (not shown in FIG. 4). By way of the above, the brush assembly 400 may be obtained that may include the third brush-mounted shaft coupled with the first brush-mounted shaft 402 (via the second coupling member 408), the first brush-mounted shaft 402 further coupled with the second brush-mounted shaft 404 (via the first coupling member 406), and the second brush-mounted shaft 404 further coupled with the fourth brush-mounted shaft (via the third coupling member 410).

In the above embodiments, a shaft for mounting ancillary members like cleaning brushes, and one or more techniques for coupling together two shafts are disclosed. The above disclosed shaft possesses high stiffness and an ability to connect with one or more shafts in series. Further, the shafts minimize the amount of material required for an equivalent stiffness. Furthermore, the shafts provide for easy inserting and removing of cleaning brushes on the on the shaft. By providing the points of coupling of the shafts (holes) at the extreme end along the radius of the shaft, maximum stiffness for the amount of material used is achieved.

Further, a coupling member is disclosed which provides for a versatile method for adding and subtracting shafts for increasing or decreasing overall length of a brush assembly (for example, the maximum obtainable length may be up to 6 meters). The coupling member eliminates the need of middle support for coupling the shafts. Further, the coupling member allows stamp manufacturing at higher volumes and lowest cost.

It is intended that the disclosure and examples be considered as exemplary only, with a true scope and spirit of disclosed embodiments being indicated by the following claims.

What is claimed is:

1. A coupling member to couple a first shaft with a second shaft, the coupling member moulded to comprise:
  a flat member having a set of holes positioned along a circumference of the flat member, wherein:
    the set of holes comprises a first sub-set of holes configured to coincide with a plurality of holes associated with the first shaft and a second sub-set of holes configured to coincide with a plurality of holes associated with the second shaft,
    the first sub-set of holes and the second sub-set of holes are alternatively arranged at about the same radial distance along the circumference of the flat member,
  wherein the coupling member is configured to:
    couple with the first shaft via the first sub-set of the set of holes associated with the coupling member and the plurality of holes associated with the first shaft, and
    couple with the second shaft via the second sub-set of the set of holes associated with the coupling member and the plurality of holes associated with the second shaft,
  wherein the flat member comprises a plurality of flanges along its circumference, and wherein each two flanges of the plurality of flanges are spaced apart to create a slot between each of the two flanges, wherein the slot is defined at an outer edge of the flat member.

2. The coupling member of claim 1, wherein the slot created by the each two flanges of the plurality of flanges is configured to coincide with each of a plurality of U-shaped slots of the first shaft and the second shaft.

3. The coupling member of claim 1,
  wherein the coupling member is configured to couple with the first shaft via the first sub-set of the set of holes associated with the coupling member and the plurality of holes associated with the first shaft using a first set of fasteners, and
  wherein the coupling member is configured to couple with the second shaft via the second sub-set of the set of holes associated with the coupling member and the plurality of holes associated with the second shaft using a second set of fasteners.

4. The coupling member of claim 3, wherein each of the first set of fasteners and the second set of fasteners comprises one or more bolts or screws, or studs.

* * * * *